(12) United States Patent
Kondapalli

(10) Patent No.: US 11,353,673 B2
(45) Date of Patent: Jun. 7, 2022

(54) METHOD FOR GROUPING OF OPTICAL FIBRES

(71) Applicant: Sterlite Technologies Limited, Gurgaon (IN)

(72) Inventor: Hemanth Kondapalli, Gurgaon (IN)

(73) Assignee: STERLITE TECHNOLOGIES LIMITED, Gurgaon (IN)

( * ) Notice: Subject to any disclaimer, the term of this patent is extended or adjusted under 35 U.S.C. 154(b) by 0 days.

(21) Appl. No.: 16/801,536

(22) Filed: Feb. 26, 2020

(65) Prior Publication Data

US 2021/0063662 A1 Mar. 4, 2021

(30) Foreign Application Priority Data

Aug. 28, 2019 (IN) .............................. 201911034683

(51) Int. Cl.
*G02B 6/44* (2006.01)
*H01F 1/00* (2006.01)
*H01F 1/047* (2006.01)

(52) U.S. Cl.
CPC ............. *G02B 6/447* (2013.01); *G02B 6/443* (2013.01); *G02B 6/448* (2013.01); *H01F 1/0018* (2013.01); *H01F 1/047* (2013.01)

(58) Field of Classification Search
CPC ........ G02B 6/447; G02B 6/443; G02B 6/448; H01F 1/0018; H01F 1/047
USPC ......................................................... 385/123
See application file for complete search history.

(56) References Cited

U.S. PATENT DOCUMENTS

| 2003/0026568 | A1* | 2/2003 | Hawtof | G02B 6/447 |
| | | | | 385/128 |
| 2011/0052898 | A1* | 3/2011 | Roberts | B29C 70/14 |
| | | | | 428/292.1 |
| 2012/0235074 | A1* | 9/2012 | Iftime | H01F 1/0054 |
| | | | | 252/62.53 |
| 2015/0337150 | A1* | 11/2015 | Cai | C09D 11/322 |
| | | | | 252/62.54 |

\* cited by examiner

*Primary Examiner* — Jerry M Blevins

(57) ABSTRACT

Present disclosure provides a method for grouping of a plurality of optical fibers using first coating layer and magnetic coating layer. The method of the present disclosure includes the step of coating of each of the plurality of optical fibers with a first coating layer and the step of coating of each of the plurality of optical fibers with a magnetic coating layer. Further, the method includes the step of applying magnetic field over the plurality of optical fibers for grouping of the plurality of optical fibers in a predefined manner. Furthermore, the first coating layer serves as a shock absorber to protect the plurality of optical fibers from physical damage.

19 Claims, 2 Drawing Sheets

METHOD FOR GROUPING OF OPTICAL FIBRES

TECHNICAL FIELD

The embodiments herein generally relates to optical fibers. More particularly, the present disclosure relates to a method for grouping of optical fibers to improve packing efficiency. The present application is based on, and claims priority from an Indian Application Number 201911034683 filed on 28 Aug. 2019, the disclosure of which is hereby incorporated by reference herein.

BACKGROUND

In the present scenario, optical fibers have significant role in making network of modern communication systems. In addition, the optical fibers are widely used for communication to meet the increasing demands. The increasing demands of the optical fibers leads to installation of high-capacity optical fiber cables. The high capacity optical fiber cables include a large number of optical fibers. The optical fibers may be in the form of optical fiber ribbons. Typically, the optical fiber ribbons in the high-capacity optical fiber cables provide an advantage of mass fusion splicing. However, poor packing efficiency of the optical fiber ribbons leads to increase in cable diameter of high fiber count cables.

In light of the above stated discussion, there is a need for efficient and effective optical fibers or a method to overcome the above stated disadvantages.

SUMMARY

The present disclosure provides the present disclosure provides a method for grouping of a plurality of optical fibers. The method includes coating of each of the plurality of optical fibers with a first coating layer and a magnetic coating layer. In addition, the method includes applying magnetic field to the plurality of optical fibers in a predefined manner.

In an embodiment of the present disclosure, optical fibers with magnetic properties are provided to improve packing efficiency of optical fiber cables.

In an embodiment of the present disclosure, optical fibers with magnetic properties are provided to identify the optical fiber cables inside earth over some distance using RFID technology and to reduce cable diameter.

In an embodiment of the present disclosure, the magnetic field is applied to the plurality of optical fibers to arrange the plurality of optical fibers in the predefined manner. Further, the magnetic field applied for grouping of a plurality of optical fibers is in range of about 0.05 tesla to 60 tesla.

In an embodiment of the present disclosure, the magnetic coating layer has magnetic ink. In addition, composition of magnetic ink is about 10% to 20% of magnetic iron oxide by weight with pigment dispersion and dopants.

In an embodiment of the present disclosure, grouping of the plurality of optical fibers in the predefined manner signifies arranging the plurality of optical fibers in parallel.

In an embodiment of the present disclosure, grouping of the plurality of optical fibers is performed for splicing of the plurality of optical fibers.

In another aspect, the present disclosure provides an optical fiber. The optical fiber includes a core, a cladding and the magnetic coating layer. The cladding surrounds the core. In addition, the magnetic coating layer has magnetic ink.

In an embodiment of the present disclosure, the optical fiber includes at least one of the first coating layer and the magnetic coating layer. The first coating layer is coated over the cladding. In addition, the magnetic coating layer surrounds the first coating layer.

In an embodiment of the present disclosure, the first coating layer is coated with magnetic ink.

In an embodiment of the present disclosure, magnetic ink is made of one of iron oxide, ferrous material, an aqueous MICR inkjet ink, traces of dia, para and ferro magnetic substances.

In an embodiment of the present disclosure, thickness of the magnetic coating layer (108) is in range of about 10 microns to 70 microns.

In an embodiment of the present disclosure, composition of magnetic ink is about 10% to 20% of magnetic iron oxide by weight with pigment dispersion and dopants.

In an embodiment of the present disclosure, the magnetic coating layer is defined by high dispersion and high magneto-electric response.

In an embodiment of the present disclosure, the magnetic coating layer facilitates identification of the optical fiber without any extra color coating layer.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which.

Figure 1:
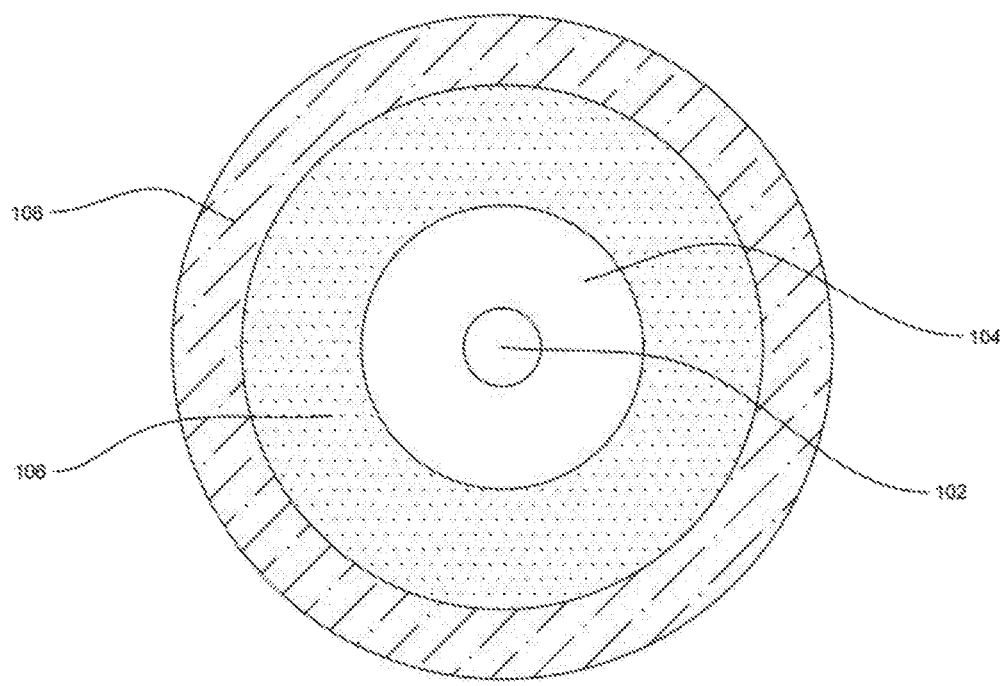
FIG. 1 illustrates a cross sectional view of an optical fiber, in accordance with various embodiments of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
- 100. Optical fiber.
- 102. Core.
- 104. Cladding.
- 106. First coating layer.
- 108. Magnetic coating layer.
- 200. Flow chart.
- 202. Step 202.
- 204. Step 204.
- 206. Step 206.
- 208. Step 208.
- 210. Step 210.

DETAILED DESCRIPTION OF EMBODIMENT

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Referring to FIG. 1, this is a cross-sectional view of an optical fiber 100, in accordance with various embodiments of the present disclosure. The cross-sectional view describes a layered structure and distribution of discrete elements of the optical fiber 100. The layered structure of the optical fiber 100 includes a core 102, a cladding 104, a first coating layer 106 and a magnetic coating layer 108.

In an embodiment of the present disclosure, the magnetic coating layer 108 has magnetic ink. The magnetic coating layer 108 provides protection to the cladding 104. In addition, magnetic ink of the magnetic coating layer 108 facilitates identification of the optical fiber 100 without any extra color coating layer. In general, optical fiber is a fiber used for transmitting information as light pulses from one end to another. In addition, optical fiber is a thin strand of glass or plastic capable of transmitting optical signals. Further, optical fiber is configured to transmit large amount of information over long distances. The optical fiber 100 includes the core 102 and the cladding 104. In an embodiment of the present disclosure, the optical fiber 100 is a single mode optical fiber. In another embodiment of the present disclosure, the optical fiber 100 is a multimode optical fiber.

The core 102 as illustrated in FIG. 1 is an inner light-carrying member of the optical fiber 100 with a high index of refraction. In general, index of refraction is dimensionless number that describes how fast light travels through material. In addition, index of refraction is defined as ratio of speed of light in vacuum and speed of light in medium. In general, core of optical fiber is cylinder of glass or plastic that runs along length of core. The core 102 is characterized by cross-sectional area. In an embodiment of the present disclosure, cross-sectional area of the optical fiber 100 is circular. In an embodiment of the present disclosure, the core 102 includes but may not be limited to magnetic coating.

The cladding 104 as illustrated in FIG. 1 is a low refractive index member. In addition, the cladding 104 has low refractive index than the core 102. Further, the cladding 104 serves to confine light to the core 102 of the optical fiber 100 by total internal reflection. In general, total internal reflection is defined as total reflection when light strikes medium boundary at angle larger than critical angle with respect to normal to surface. In addition, critical angle is minimum angle of incidence that causes total reflection. In an embodiment of the present disclosure, the cladding 104 surrounds the core 102 of the optical fiber 100. In an embodiment of the present disclosure, the cladding 104 include but may not be limited to the magnetic coating.

The optical fiber 100 includes the first coating layer 106. The first coating layer 106 is coated over the cladding 104. In addition, the first coating layer 106 provides mechanical isolation and protection to the optical fiber 100. In addition, the first coating layer 106 protects the optical fiber 100 from physical damage. In an embodiment of the present disclosure, the first coating layer 106 prevents internal stress developed within the core 102 and the cladding 104. In an embodiment of the present disclosure, the first coating layer 106 acts like a shock absorber to protect the core 102 and the cladding 104. In an embodiment of the present disclosure, the first coating layer 106 includes one or more coats of a plastic material to protect the optical fiber 100 from physical environment. In another embodiment of the present disclosure, the first coating layer 106 includes but may not be limited to the magnetic coating. In yet another embodiment of the present disclosure, the first coating layer 106 includes one or more coats. The one or more coats are made of plastic material to protect the optical fiber 100 from physical environment. In an embodiment of the present disclosure, composition of magnetic ink includes one or more combination of iron oxide, and ferrous materials with small particle size. In addition, the composition of magnetic ink includes but not be limited to combination of traces of dia, para, and ferro magnetic substances or an aqueous MICR inkjet ink. In another embodiment of the present disclosure, the composition of magnetic ink includes 10% to 20% of magnetic iron oxide by weight with pigment dispersion and dopants (like cobalt, etc.). In yet another embodiment of the present disclosure, the composition of magnetic ink includes any combination of materials suitable to provide magnetic property.

The optical fiber 100 includes the magnetic coating layer 108. The magnetic coating layer 108 is a layer of magnetic ink coating. In an embodiment of the present disclosure, the magnetic coating layer 108 provides magnetic characteristics to the optical fiber 100. The magnetic coating layer 108 is coated over the first coating layer 106. In addition, the magnetic coating layer 108 is has magnetic ink. Further, the magnetic coating layer 108 surrounds the first coating layer 106. In an embodiment of the present disclosure, the magnetic coating layer 108 has one or more properties. The one or more properties of the magnetic coating layer 108 include isotropy, high dispersion, high magneto-electric response, and the like. In an embodiment of the present disclosure, the magnetic coating layer 108 provides physical protection to the optical fiber 100. The first coating layer 106 and the magnetic coating layer 108 protects the core 102 and the cladding 104 of the optical fiber 100. In addition, the first coating layer 106 prevents the optical fiber 100 from mechanical stresses induced by the magnetic coating layer 108.

The magnetic coating layer 108 protects the optical fiber 100 from environmental stresses as well as mechanical stresses. In an embodiment of the present disclosure, the magnetic coating layer 108 protects the cladding 104. In addition, the magnetic coating layer 108 facilitates identification of the optical fiber 100 without any extra color coating layer. In general, optical fiber is used for transmitting information as light pulses from one end to another. In addition, optical fiber is thin strand of glass or plastic capable of transmitting optical signals. Further, optical fiber is configured to transmit large amount of information over long distances. The optical fiber 100 includes the core 102 and the cladding 104. In an embodiment of the present disclosure, the optical fiber 100 is a single mode optical fiber. In another embodiment of the present disclosure, the optical fiber 100 is a multimode optical fiber.

In an embodiment of present disclosure, the first coating layer 106 and the magnetic coating layer 108 protect the core 102 and the cladding 104 of the optical fiber 100. The first coating layer 106 avoids internal stresses developed within the core 102 and the cladding 104. In addition, the first coating layer 106 avoids mechanical stresses induced by the magnetic coating layer 108. The magnetic coating layer 108 protects the optical fiber 100 from environmental stresses as well as mechanical stresses.

In an embodiment of the present disclosure, the optical fiber 100 has a diameter of about 200 micrometer. In another embodiment of the present disclosure, the diameter of the optical fiber 100 may vary. In an embodiment of the present disclosure, the optical fiber 100 may have any suitable diameter according to number and dimension of layers. In an embodiment of the present disclosure, the optical fiber 100 is made up of silica material. In another embodiment of the present disclosure, the optical fiber 100 is made up of aluminum material. In yet another embodiment of the present disclosure, the optical fiber 100 is made up of any suitable material. In an embodiment of the present disclosure, the optical fiber 100 is a colored optical fiber. In another embodiment of the present disclosure, the optical fiber 100 may not be the colored optical fiber.

Figure 2:
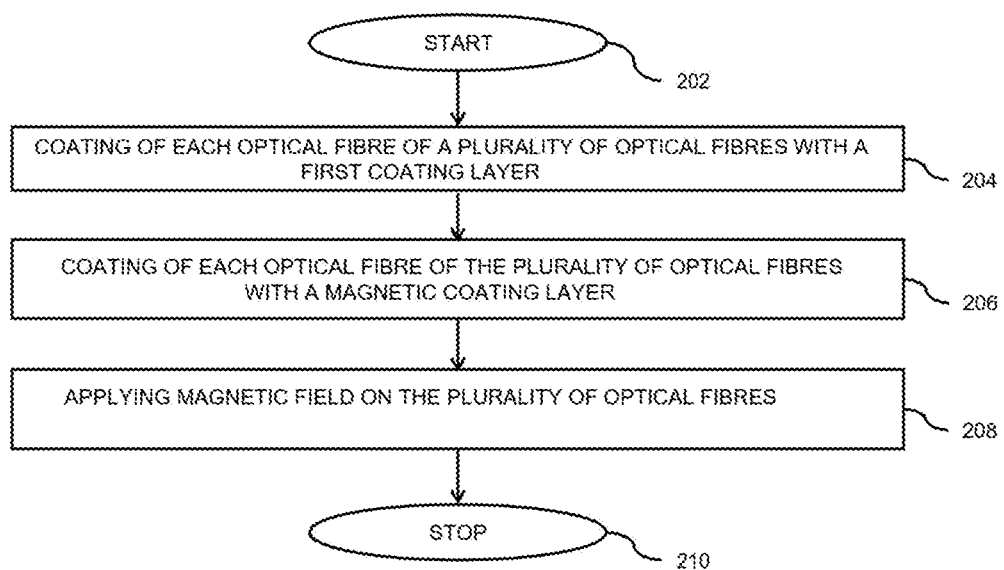
FIG. 2 illustrates a flow chart of a method for grouping of optical fibers, in accordance with various embodiments of the present disclosure.

Referring to FIG. 2, this is a flow chart 200 of a method for grouping of a plurality of optical fibers, in accordance with various embodiments of the present disclosure.

The flow chart 200 initiates at step 202. Following step 202, at step 204, the method includes first coating of each of the plurality of optical fibers with the first coating layer 106. In addition, each of the plurality of optical fibers corresponds to the optical fiber 100 of FIG. 1. The first coating layer 106 surrounds the cladding 104. In addition, the first coating layer 106 provides mechanical isolation and protection to each of the plurality of optical fibers from physical damage. Further, the first coating layer 106 serves as the shock absorber to protect the core 102 and the cladding 104. Furthermore, the first coating layer 106 includes the one or more coats of the plastic material to protect the optical fiber 100 from physical environment.

At step 206, the method includes coating of each of the plurality of optical fibers with the magnetic coating layer 108. Further, the magnetic coating layer 108 surrounds the first coating layer 106. Furthermore, the magnetic coating layer 108 provides magnetic characteristics to the plurality of optical fibers. Moreover, the magnetic coating layer 108 has the one or more properties. The one or more properties include but may not be limited to isotropy, high dispersion, and high magneto-electric response. Also, the magnetic coating layer 108 provides physical protection to each of the plurality of optical fiber 100. Also, the magnetic coating layer 108 protects each of the plurality of optical fibers from environmental stresses as well as mechanical stresses. Also, the magnetic coating layer 108 protects the cladding 104. In addition, the magnetic coating layer 108 facilitates identification of each of the plurality of optical fibers without any extra color coating layer. Also, each of the plurality of optical fibers is the colored optical fiber. In an embodiment of the present disclosure, each of the plurality of optical fibers has different color. In addition, color of the plurality of optical fibers is used for identification of each of the plurality of optical fibers. Further, color of the plurality of optical fibers include but may not be limited to green, blue, yellow and red.

At step 208, the method includes applying magnetic field to the plurality of optical fibers using magnetic field generator. In addition, magnetic field is applied to the plurality of optical fibers to group the plurality of optical fibers in a predefined manner. In addition, grouping of the plurality of optical fibers in the predefined manner signifies arranging the plurality of optical fibers in parallel. In an embodiment of the present disclosure, the magnetic field generator produces magnetic field during splicing. In addition, the magnetic field applied for grouping of a plurality of optical fibers is in range of about 0.05 tesla to 60 tesla. In addition, the magnetic field generator groups the plurality of optical fibers in a parallel manner. Further, the magnetic field generator eliminates requirement of an adhesive material for the grouping of the plurality of optical fibers. Furthermore, the magnetic field generator magnetizes each of the plurality of optical fibers. Moreover, the magnetic field generator is associated with a splicing machine. Also, the splicing machine performs splicing of the plurality of optical fibers. Also, the grouping of the plurality of optical fibers is performed during splicing of the plurality of optical fibers by the splicing machine. Also, the magnetic field generator controls magnetic field strength while grouping the plurality of optical fibers during splicing in the splicing machine. Also, the magnetic field generator is switched on or off by regulating electric energy during splicing in the splicing machine. Also, the grouping of the plurality of optical fibers by the magnetic field generator reduces time of splicing for high fiber count optical fiber cable. Also, the grouping of the plurality of optical fibers during splicing leads to formation of a plurality of optical fiber ribbons.

Also, the plurality of optical fibers is magnetized due to magnetic field produced by the magnetic field generator during splicing. Also, the magnetic field generator with arrangement of the plurality of optical fibers is installed in the splicing machine for the grouping and splicing of the plurality of optical fibers. Also, the plurality of optical fibers is spliced as group in the splicing machine to reduce splicing time.

Also, the splicing machine helps in mass fusion splicing of the plurality of optical fibers. The splicing machine splices each of the plurality of optical fibers with optical fibers of another optical fiber cable. Also, the splicing machine during splicing arranges the plurality of optical fiber ribbons according to color with similar type of ribbons. The flow chart terminates at step 210.

The optical fiber with the magnetic coating layer provides numerous advantages over the prior art. The magnetic coating layer is the layer of magnetic ink coating. The optical fiber with the layer of the magnetic ink coating facilitates in the improvement of packing efficiency for high fiber count cables. In addition, the optical fiber with the layer of the magnetic ink coating introduces the magnetic properties. Further, the optical fiber with the layer of the magnetic ink coating facilitates in reducing splicing time during mass fusion splicing. Furthermore, the optical fiber with the magnetic coating layer eliminates requirement of the adhesive material for grouping.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for grouping of a plurality of optical fibers, wherein the plurality of optical fibers is coated with a magnetic coating layer, the method comprising:
    applying magnetic field to the plurality of optical fibers to arrange the plurality of optical fibers in a predefined arrangement, wherein the magnetic coating layer eliminates requirement of adhesive material for the grouping of the plurality of optical fibers.

2. The method as claimed in claim 1, wherein the magnetic coating layer consists of magnetic material properties and after coating the plurality of optical fibers with the magnetic coating later, the plurality of optical fibers are placed in one plane where adjacent fibers attract each other to form a ribbon-like structure.

3. The method as claimed in claim 1, wherein at a time of splicing, a magnetic generator at cable termination magnetizes splice holder for grouping the plurality of optical fibers together which in turn leads to better efficiency and reliability of magnetic bonds between any two adjacent fibers.

4. The method as claimed in claim 1, wherein the magnetic field applied for the grouping of the plurality of optical fibers is in a range of 0.05 tesla to 60 tesla.

5. The method as claimed in claim 1, wherein thickness of the magnetic coating layer is in a range of 10 microns to 70 microns.

6. The method as claimed in claim 1, wherein the magnetic field is applied to the plurality of optical fibers to arrange the plurality of optical fibers in the predefined arrangement to form a ribbon-like structure.

7. The method as claimed in claim 1, wherein the magnetic coating layer has magnetic ink, wherein composition of the magnetic ink is 10% to 20% of magnetic iron oxide by weight with pigment dispersion and dopants.

8. The method as claimed in claim 1, wherein the grouping of the plurality of optical fibers in the predefined arrangement signifies arranging the plurality of optical fibers in parallel.

9. An optical fiber comprising:
    a core;
    a cladding, wherein the cladding surrounds the core; and
    a magnetic coating layer, wherein the magnetic coating layer has magnetic ink, wherein the magnetic coating layer is defined by high dispersion and high magneto-electric response.

10. The optical fiber as claimed in claim 9, wherein the optical fiber further comprises:
    at least one of a first coating layer, and the magnetic coating layer, wherein the first coating layer is coated over the cladding, wherein the magnetic coating layer surrounds the first coating layer.

11. The optical fiber as claimed in claim 10, wherein the first coating layer is coated with the magnetic ink.

12. The optical fiber as claimed claim 9, wherein the magnetic ink is made of one of iron oxide, ferrous material, an aqueous MICR inkjet ink, traces of dia, para and ferro magnetic substances.

13. The optical fiber as claimed in claim 9, wherein thickness of the magnetic coating layer is in a range of 10 microns to 70 microns.

14. The optical fiber as claimed in claim 9, wherein composition of the magnetic ink is 10% to 20% of magnetic iron oxide by weight with pigment dispersion and dopants.

15. The optical fiber as claimed in claim 9, wherein the magnetic coating layer facilitates identification of the optical fiber without any extra color coating layer.

16. An optical fiber comprising:
    a core;
    a cladding, wherein the cladding surrounds the core; and
    a magnetic coating layer over the cladding, wherein the magnetic coating layer has magnetic ink, wherein the magnetic coating layer is defined by high dispersion and high magneto-electric response.

17. The optical fiber as claimed in claim 16, wherein the magnetic ink has one of iron oxide, ferrous material, an aqueous MICR inkjet ink, traces of dia, para and ferro magnetic substances.

18. The optical fiber as claimed in claim 16, wherein thickness of the magnetic coating layer is in a range of 10 microns to 70 microns.

19. The optical fiber as claimed in claim 16, wherein composition of the magnetic ink is 10% to 20% of magnetic iron oxide by weight with pigment dispersion and dopants.

* * * * *